(12) United States Patent
Bach

(10) Patent No.: US 6,353,742 B1
(45) Date of Patent: *Mar. 5, 2002

(54) METHOD AND APPARATUS FOR BACKHAULING DATA IN A COMMUNICATION SYSTEM

(75) Inventor: Michael J. Bach, Kildeer, IL (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,418

(22) Filed: Oct. 28, 1998

(51) Int. Cl.[7] ............................................... H04B 1/38
(52) U.S. Cl. ..................... 455/453; 455/425; 455/424; 370/332
(58) Field of Search ................................. 455/445, 453, 455/524, 525, 560, 442, 443, 522; 370/329, 332, 335, 342

(56) References Cited

U.S. PATENT DOCUMENTS

| | | | | |
|---|---|---|---|---|
| 5,711,004 A | * | 1/1998 | Blasiak et al. | 455/436 |
| 5,787,076 A | * | 7/1998 | Anderson et al. | 370/294 |
| 5,859,838 A | * | 1/1999 | Soliman | 370/249 |
| 5,884,187 A | * | 3/1999 | Ziv et al. | 455/422 |
| 5,923,650 A | * | 7/1999 | Chen et al. | 370/331 |
| 5,940,430 A | * | 8/1999 | Love et al. | 375/200 |
| 5,966,662 A | * | 10/1999 | Murto | 455/458 |
| 5,987,326 A | * | 11/1999 | Tiedemann, Jr. et al. | 455/442 |
| 5,991,628 A | * | 11/1999 | Pedziwiatr et al. | 455/443 |
| 6,058,107 A | * | 5/2000 | Love et al. | 370/252 |
| 6,222,830 B1 | * | 4/2001 | Padovani et al. | 370/332 |
| 6,233,439 B1 | * | 5/2001 | Jalali | 455/127 |

* cited by examiner

*Primary Examiner*—William Trost
*Assistant Examiner*—Tilahun Gesesse
(74) *Attorney, Agent, or Firm*—John B. MacIntyre; Mario J. Donato, Jr.; L. Bruce Terry

(57) ABSTRACT

The present invention provides a method and apparatus for backhauling data in a communication system (100). A plurality of quality metrics are received at a centralized controller (105) from a plurality of base stations (101–104). The quality metrics are related to a data frame transmitted to the base stations (101–104) from a remote unit (113). A preferred data frame is determined from among the data frames. The centralized controller (105) then signals the base station associated with the preferred data frame to send the preferred data frame to the centralized controller.

18 Claims, 7 Drawing Sheets

|   | 7 | 6 | 5 | 4 | 3 | 2 | 1 | 0 |
|---|---|---|---|---|---|---|---|---|
| 701 → 1 | CHANNEL IDENTIFIER 16 | CHANNEL IDENTIFIER 15 | CHANNEL IDENTIFIER 14 | CHANNEL IDENTIFIER 13 | CHANNEL IDENTIFIER 12 | CHANNEL IDENTIFIER 11 | CHANNEL IDENTIFIER 10 | CHANNEL IDENTIFIER 9 |
| 702 → 2 | CHANNEL IDENTIFIER 8 | CHANNEL IDENTIFIER 7 | CHANNEL IDENTIFIER 6 | CHANNEL IDENTIFIER 5 | CHANNEL IDENTIFIER 4 | CHANNEL IDENTIFIER 3 | CHANNEL IDENTIFIER 2 | CHANNEL IDENTIFIER 1 |
| 703 → 3 | FRAME TYPE 3 | FRAME TYPE 2 | FRAME TYPE 1 | FRAME SEQUENCE NUMBER 3 | FRAME SEQUENCE NUMBER 2 | FRAME SEQUENCE NUMBER 1 | QUALITY 2 | QUALITY 1 |

|   | 7 | 6 | 5 | 4 | 3 | 2 | 1 | 0 |
|---|---|---|---|---|---|---|---|---|
| 801 — 1 | CHANNEL IDENTIFIER 16 | CHANNEL IDENTIFIER 15 | CHANNEL IDENTIFIER 14 | CHANNEL IDENTIFIER 13 | CHANNEL IDENTIFIER 12 | CHANNEL IDENTIFIER 11 | CHANNEL IDENTIFIER 10 | CHANNEL IDENTIFIER 9 |
| 802 — 2 | CHANNEL IDENTIFIER 8 | CHANNEL IDENTIFIER 7 | CHANNEL IDENTIFIER 6 | CHANNEL IDENTIFIER 5 | CHANNEL IDENTIFIER 4 | CHANNEL IDENTIFIER 3 | CHANNEL IDENTIFIER 2 | CHANNEL IDENTIFIER 1 |
| 803 — 3 | FRAME TYPE 3 | FRAME TYPE 2 | FRAME TYPE 1 | FRAME SEQUENCE NUMBER 3 | FRAME SEQUENCE NUMBER 2 | FRAME SEQUENCE NUMBER 1 | INDICATION 2 | INDICATION 1 |

METHOD AND APPARATUS FOR BACKHAULING DATA IN A COMMUNICATION SYSTEM

FIELD OF THE INVENTION

The present invention relates generally to communication systems, and more particularly to a method and apparatus for backhaul in a communication system.

BACKGROUND OF THE INVENTION

Cellular communication systems provide for communication between remote units and cellular base stations. Cellular communication systems allow for a remote unit to transfer processing from one base station to another. This process of transferring processing of a call is commonly referred to as handoff.

There are two types of handoff in cellular communication systems. Hard handoff refers to a process wherein processing of a call is transferred from a first base station to a second base station that is better able to process the call. Soft handoff refers to a process wherein a remote unit is simultaneously communicating with several base stations. Each base station receives the communication signal from the remote unit. The base station receivers demodulate the signal received from the remote unit, and send the demodulated data to a selection unit after demodulation. The selection unit then selects the best frame of those sent to it based upon a quality metric associated with each frame. The base stations in communication with the remote unit backhaul that remote unit's demodulated data to a selection unit that selects the best frame, based upon the quality metric, received from the base stations in communication with the remote unit.

A major cost for cellular operators is that for backhaul connection expense. As used herein, backhaul refers to transporting data between communication infrastructure equipment. Whether the backhaul connections consist of T1 connections, copper cables, fiber optic cables, coaxial cables, microwave links, or other connections, the cost associated with the backhaul connections between infrastructure equipment is sizable.

During periods when a remote unit is in communication with multiple base stations, such as during soft handoff, a frame is sent by the remote unit and received by all base stations involved in the soft handoff communication. In current communication systems, each of these base stations will demodulate the data and send, or backhaul, the data to other cellular infrastructure equipment. Each base station that backhauls this data is taking up precious bandwidth in the system. In addition, even though multiple base stations are receiving, demodulating, and backhauling the data, only one copy of the data will be used by he cellular infrastructure equipment. The other data is discarded after being expensively backhauled.

Consequently, a need exists for a method and apparatus for backhauling data within a communication system that is less costly and more efficient than prior art methods of backhauling data.

BRIEF DESCRIPTION OF THE DRAWINGS

FIG. 7 depicts a portion of a quality metrics backhaul packet in accordance with the preferred embodiment of the present invention; and FIG. 8 depicts a portion of an indication packet in accordance with the preferred embodiment of the present invention.

DETAILED DESCRIPTION OF A PREFERRED EMBODIMENT

The present invention provides a method for backhauling data in a communication system. The present invention is particularly useful in a situation where a remote unit is communicating with a plurality of base stations, such as in a soft handoff scenario. Each of the base stations in communication with the remote unit determines a quality metric associated with the data frame received from the remote unit. The base stations then send the quality metrics to a centralized controller, such as a Centralized Base Site Controller (CBSC). The centralized controller determines a preferred data frame from among the data frames sent from the remote unit to the base stations. The centralized controller then signals the base station associated with the preferred data frame to send the preferred data frame to the centralized controller. In this manner, only one of the copies of the data frame is backhauled to the cellular infrastructure equipment. Consequently, less bandwidth is taken up, since multiple copies of the same data frame are not backhauled.

Figure 1:
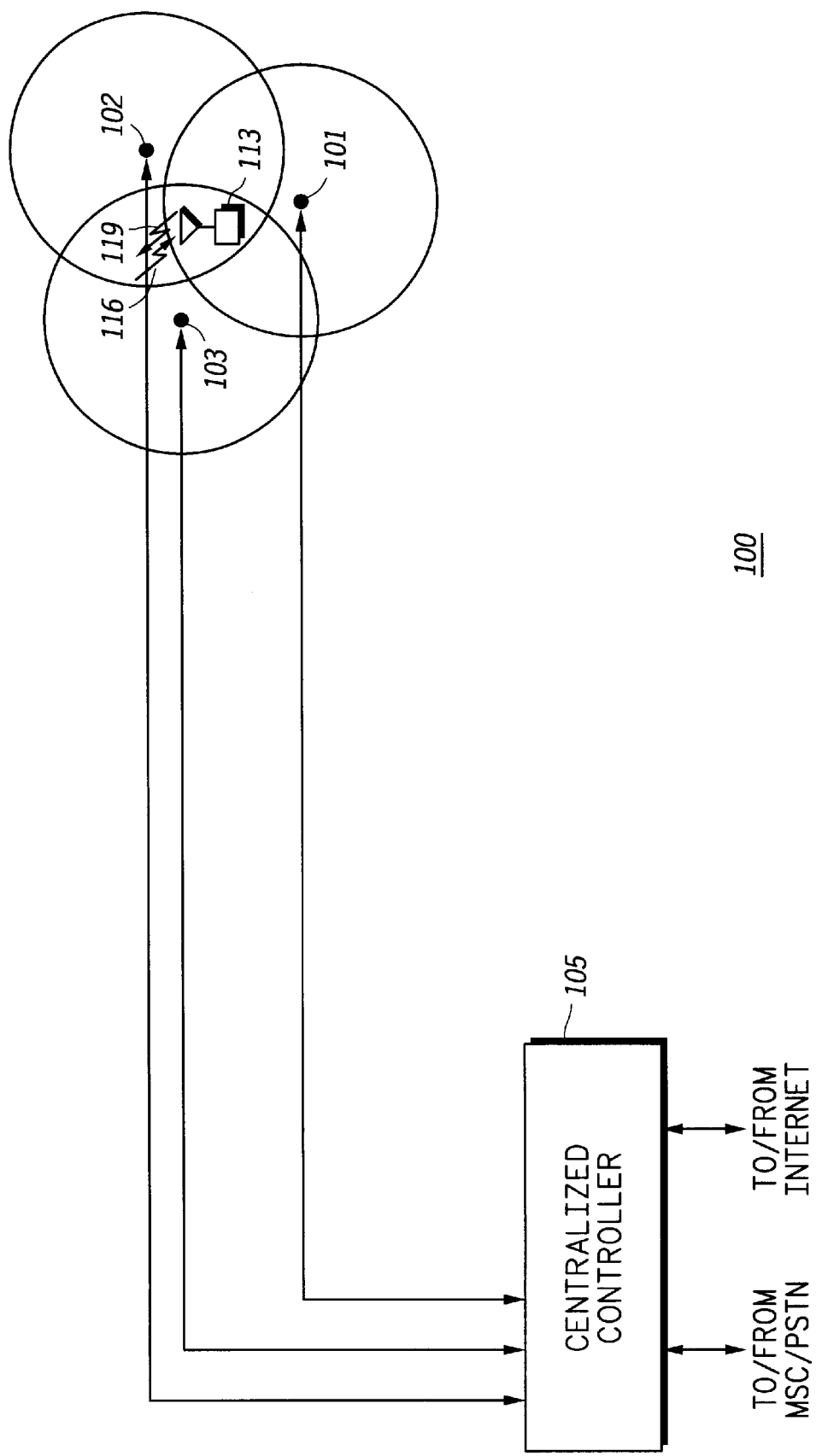
FIG. 1 depicts a communication system in accordance with the preferred embodiment of the present invention.

The present invention can be better understood with reference to FIGS. 1–8. FIG. 1 illustrates a wireless communication system in accordance with the preferred embodiment of the present invention. In the preferred embodiment of the present invention, communication system 100 utilizes a Code Division Multiple Access (CDMA) system protocol. One such protocol is described in "Personal Station-Base Station Compatibility Requirements for 1.8 to 2.0 GHz Code Division Multiple Access (CDMA) Personal Communication Systems" (American National Standards Institute (ANSI) J-STD-008). In alternate embodiments, communication system 100 may utilize other analog or digital cellular communication system protocols such as, but not limited to, developing 3G standards such as the CDMA2000 vision, Wideband CDMA for UMTS, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol.

Communication system 100 includes base stations 101–103, remote unit 113, and centralized controller 105. In the preferred embodiment of the present invention, base stations 101–103 are preferably "MOTOROLA" base stations and centralized controller 105 is preferably a "MOTOROLA" Centralized Base Station Controller (CBSC) component. As shown, remote unit 113 is communicating with base stations 101–103 via uplink communication signals 119 and base stations 101–103 are communicating with remote unit 113 via downlink communication signals 116. The same number of base stations preferably communicate uplink and downlink signals. In the preferred embodiment of the present invention, base stations 101–103 are suitably coupled to centralized controller 105, and centralized controller 105 is suitably coupled to a Mobile Switching Center (MSC) (not shown), and ultimately to a Public Switched Telephone Network (PSTN) (not shown) .Centralized controller 105 is also suitably coupled, via a Packet Data Gateway (PDG) or the like, to packet networks such as the Internet.

Operation of communication system 100 in accordance with the present invention occurs as follows. Upon receipt of uplink communication signal 119, base stations 101–103 properly downconvert, de-spread, and demodulate uplink communication signal 119 via a receiver to recover demodulated data transmitted from remote unit 113. The demodulated data is preferably comprised of frames which are 20 milliseconds in length with each frame being transmitted at a particular transmission rate. Rather than backhauling data immediately to centralized controller 105, each of the base stations 101–103 calculates quality metrics related to uplink communication signal 119. Each of the base stations 101–103 transmits the quality metrics to centralized controller 105. Centralized controller 105 will preferably determine a preferred data frame received by one of the base stations 101–103. Centralized controller 105 will then signal the base station associated with the preferred data frame to send the preferred data frame to centralized controller 105.

Consequently, backhaul connection traffic between centralized controller 105 and base stations 101–103 is reduced, thereby reducing the bandwidth used for frames that are either redundant or are bad.

Figure 2:
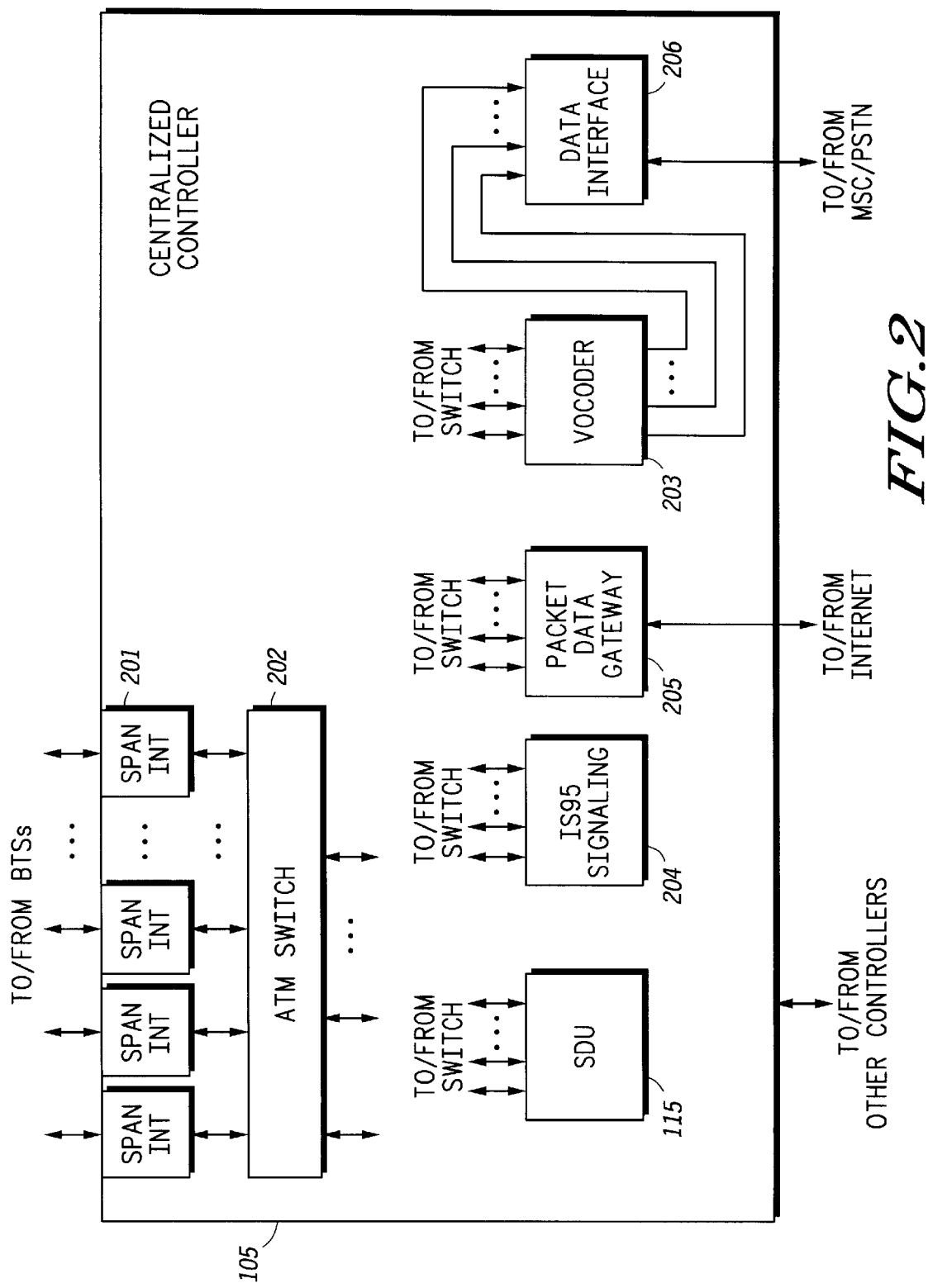
FIG. 2 depicts a block diagram of a centralized controller in accordance with the preferred embodiment of the present invention.

FIG. 2 depicts a block diagram of a centralized controller 105, such as in a CBSC, in accordance with the preferred embodiment of the present invention. Centralized controller 105 includes a switch 202, which in the preferred embodiment is an Asynchronous Transfer Mode (ATM) switch as depicted in FIG. 2. Switch 202 may alternately be a circuit switch or a frame relay or IP (Internet Protocol) router. Centralized controller 105 also includes a plurality of span interfaces 201, also referred to as line interfaces, that interface with base stations 101–103. Span interfaces 201 may be a part of switch 202. Span interfaces 201 are typically DS-1 plesiochronous (nearly synchronous) interfaces such as T1 connections, E1 connections, or J1 connections. T1 and J1 span interfaces carry 24 64 Kbps PCM voice packets for a nominal rate of 1.544 Mbps. In the preferred embodiment, each base station has a plurality of T1 interfaces associated therewith.

Centralized controller 105 also includes a plurality of network elements 115 and 203–205 that may be coupled to switch 202, such as selector distribution unit 115, a vocoder 203, an IS95 signaling processor 204, and a packet data gateway 205.

In the preferred embodiment of the present invention, ATM switch 202 is coupled to selector distribution unit 115. In this configuration, ATM switch 202 sends data packets to selector distribution unit 115. As used in accordance with the present invention, ATM switch 202 receives quality metrics from base stations 101–103. These quality metrics relate to a data frame that is transmitted from remote unit 113. Rather than send each of these duplicate data frames in backhaul packets to centralized controller 105, which would consume excess bandwidth, each BTS 101–103 in communication with remote unit 113 sends a packet that includes quality metrics relating to the data frame. Such a packet is depicted in more detail in FIG. 7 below. These packets are preferably ATM cells, each of which is 53 bytes in length. Data or frame data is packaged as packets for backhaul transfer.

These quality metrics can include, or be derived from, frame erasure rate (FER), received energy, and/or Viterbi convolutional decoder metrics, such as symbol error rate (SER) or total metric (TM). It should be understood that each base station 101–103 can send these quality metrics using less of a packet than if the entire data frame was sent. In addition, quality metric data from other remote units can be packaged together into these packets to minimize the number of packets that need to be sent to relay additional information to centralized controller 105. Since this quality data directs the frame data to be sent, it receives high priority within the traffic management function.

In the preferred embodiment of the present invention, selector distribution unit 115 receives these quality metrics from switch 202. Selector distribution unit 115 then collects these quality metrics until ready to process the quality metrics. Selector distribution unit 115 will attempt to wait to process the quality metrics until it has received all of the quality metrics from all base stations in communication with remote unit 113. In this manner, selector distribution unit 115 can make a complete choice as to which base station should send the best data frame to centralized controller 105.

By sending quality metrics from base stations 101–103 to selector distribution unit 115 and allowing selector distribution unit 115 to choose the best quality frame, the amount of data backhauled in the communication system is reduced. This is particularly true during periods when a remote unit is transmitting frames to multiple base stations, such as during soft handoff.

The present invention also provides for an improved method for backhauling data in a communication system by reducing the backhauling of frames that include bad data. If a frame is received with bad data at one of the base stations that the remote unit is in communication with, the quality metrics for this frame will be low. This would indicate that the frame received is bad. In the preferred embodiment, the quality metrics will be below a predetermined threshold and will indicate that this is a bad frame. If FER is used, a bad Cyclic Redundancy Check (CRC) can indicate a bad frame. The encoder on the transmitter generates additional bits to create unique codes that the receiver checks. Since this is a bad frame, a frame that includes better data, and correspondingly better quality metrics, will be chosen by selector distribution unit 115 to transmit the data frame to centralized controller 105. If no frames have quality metrics above the predetermined threshold, selector distribution unit 115 will preferably not tell any base stations to transmit the data frame related to the bad quality metric. In this manner, no data frames will be sent, and since all data frames in this scenario are bad, bandwidth across the backhaul infrastructure is saved by not sending data frames that are useless to the communication system.

ATM switch 202 can also be coupled to a vocoder 203. Vocoder 203 receives data frames from base stations 101–103. Vocoder 203 reduces the bit rate to transfer speech to a remote unit from nominal 64 Kbps Pulse Code Modulation (PCM) by removing redundancy. In the reverse direction, vocoder 203 restores vocoded frames to PCM. In the preferred embodiment, vocoder 203 will only receive data frames that include data that has a quality metric above a predetermined threshold. In this manner, vocoder 203 is not attempting to process frames that are known to be bad. Vocoder 203 relays the data frames to data interface 206, which is coupled thereto. Data interface 206 processes the frames and sends the PCM to a Mobile Switching Center (MSC), which in turn may send the voice to a Public Switched Telephone Network (PSTN) for switching to a landline user.

ATM switch 202 can also be coupled to an IS95 signaling processor 204. IS95 signaling processor 204 performs resource allocation, call processing, and mobility manager functionality using dedicated channels or signaling channels provided by the air interface, such as sync, paging, or access. The present invention provides for a minimization of backhaul traffic by backhauling the control and signaling frames only when necessary, a major improvement over the prior art.

ATM switch 202 can also be coupled to a packet data gateway 205. In the embodiment as depicted in FIG. 2, packet data gateway 205 is connected to the internet. Packet data gateway 205 receives packets from ATM switch 202, and performs necessary processing to relay data to the internet.

Figure 3:
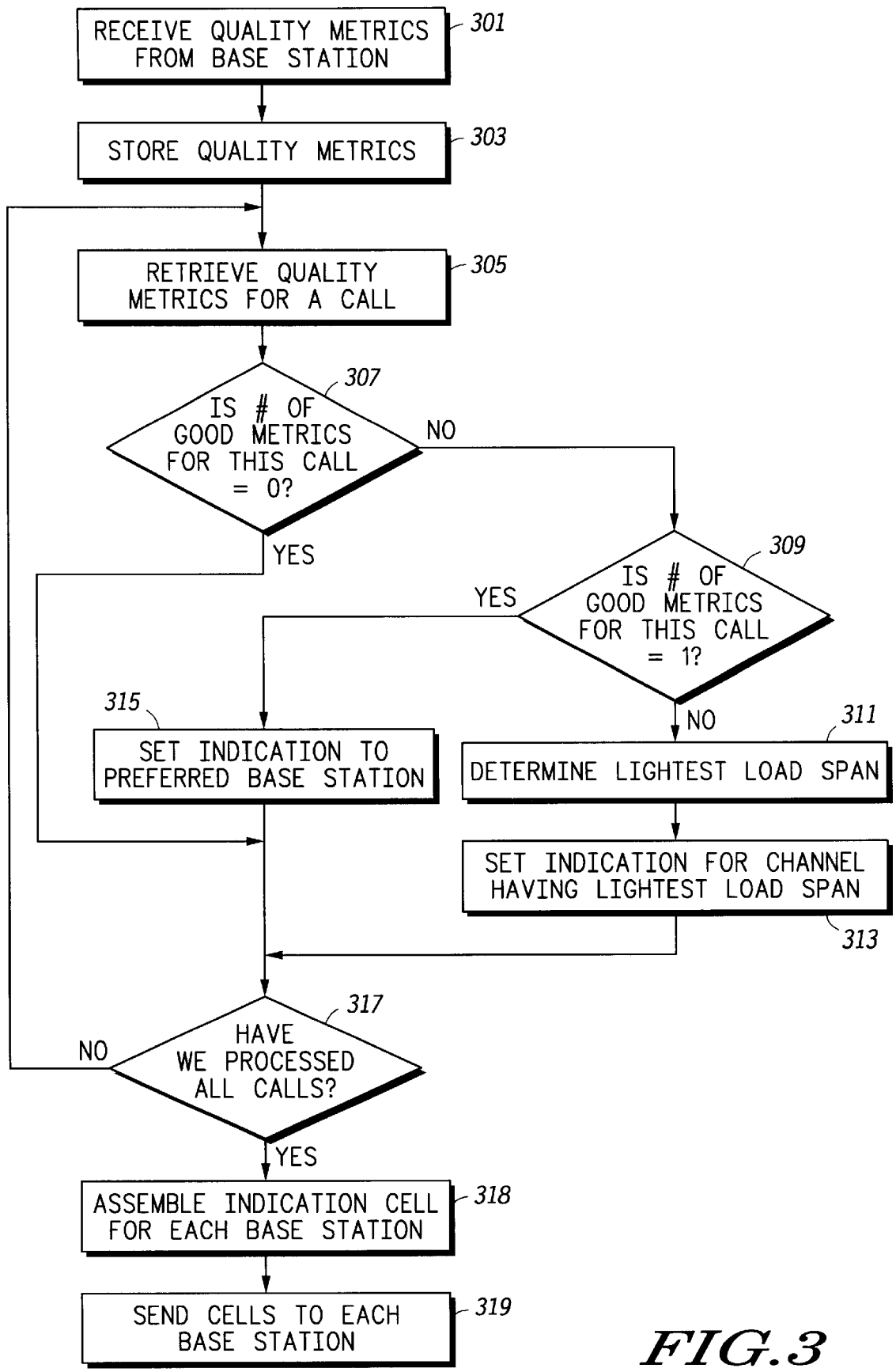
FIG. 3 depicts a flow chart for determining which base stations should send frames to the centralized controller.

FIG. 3 depicts a flow chart for determining which base stations should send frames to the centralized controller, CBSC 105, in accordance with the preferred embodiment of the present invention. The centralized controller receives (301) quality metrics from each of the base stations in communication with remote unit 113. The quality metrics indicate whether a frame is bad and/or may estimate the number of bits or symbols in error. This information is available from the block and Viterbi decoders. In the preferred embodiment, each base station multiplexes the quality metrics into a backhaul packet, as described in FIG. 7, that is sent to the centralized controller and preferably includes other information.

The centralized controller stores (303) the quality metrics. In the preferred embodiment, the centralized controller will store the quality metrics for each base station that is currently communicating with a remote unit, such as in the case of soft handoff. The centralized controller will preferably wait until it has determined that it has received all quality metrics from all base stations associated with a remote unit. Different delays can be caused by differential delays in each base station's backhaul, by BTS processing delays, by the propagation delays of uplink communication signals 119, and by differences in the remote unit's transmit start time. When the centralized controller has waited as long as it can without introducing unacceptable delay, it should have received all quality metrics relating to a communication from a remote unit. The centralized controller retrieves (305) the quality metrics for a call. The quality metrics associated with different base stations most likely come in to the centralized controller at different times due to different processing and transfer delays.

The centralized controller then determines (307) if the number of good metrics for the call being processed is equal to zero. This will happen when all of the links for this call between the remote unit and all of the base stations are currently bad, which may occur during fast fading or other scenarios. If the number of good metrics for this call is zero, there are no base stations that have received a good data frame associated with this quality metric. Consequently, the information from the remote unit is not sent to the centralized controller. The centralized controller may communicate with vocoder 203 and instructs vocoder 203 that vocoder 203 should not expect to receive data this period if the frame type is speech. If the application sending data is sending delay-tolerant data, the centralized controller may instruct the remote unit to retransmit the data. If there are no good metrics for this call, the centralized controller will proceed to decision block 317, described in further detail below, to determine if all calls have been processed.

If the number of good metrics for this call is not zero, the centralized controller determines (309) if the number of good metrics for this call is equal to one. If the number of good quality metrics for this call is one, the centralized controller concludes that only one base station has received a data frame associated with this quality metric that includes good data. In this scenario, the centralized controller will set (315) the indication for the base station that received the good data frame to send the data associated with the good quality metric. It will know this base station received a quality frame for this due to the good quality metric.

If the number of good quality metrics for this call is not zero and is not one, the centralized controller concludes that there are multiple base stations that received a quality frame associated with this quality metric. In the prior art, each of the base stations that received a good frame would send the frame in a packet or packets to the centralized controller. This consumed excess bandwidth in the backhaul, due to bad frames or redundant frames being sent for the same data frame.

In accordance with the preferred embodiment of the present invention, if multiple spans have the ability to transfer the packet, the centralized controller determines (311) which span has the lightest load. The centralized controller then sets (313) an indication to the BTS with the current lightest load span. In this manner, not only does the present invention reduce the number of bad and redundant frames sent to the centralized controller, but the present invention also provides for a method and apparatus for distributing the backhaul of data by utilizing channels that have the lightest load span to send data frames that the base station has in common with other base stations that have a heavier span.

The centralized controller then determines (317) if the centralized controller has processed all calls. In the preferred embodiment of the present invention, the centralized controller will process quality metrics for all calls for the current time period. If desired, some calls types may not use the technique of the present invention, but rather immediately send data from all base station where available. One example would be when the communication is not in a soft handoff mode or for calls that require minimum latency. If the centralized controller has not processed all calls, it will return to step 305 and retrieve quality metrics for another call.

If the centralized controller has processed all calls, the centralized controller assembles (318) an indication cell or cells for each base station. The single call portion of the indication cell is depicted more fully in FIG. 8 below. The centralized controller then sends (319) the indication cells to each base station. The indication cell indicates to each base station which data frames the base station should send to the CBSC. In the preferred embodiment, these will be the "good" frames that had the best quality metric from among the same frames transmitted by remote unit 113.

Figure 4:
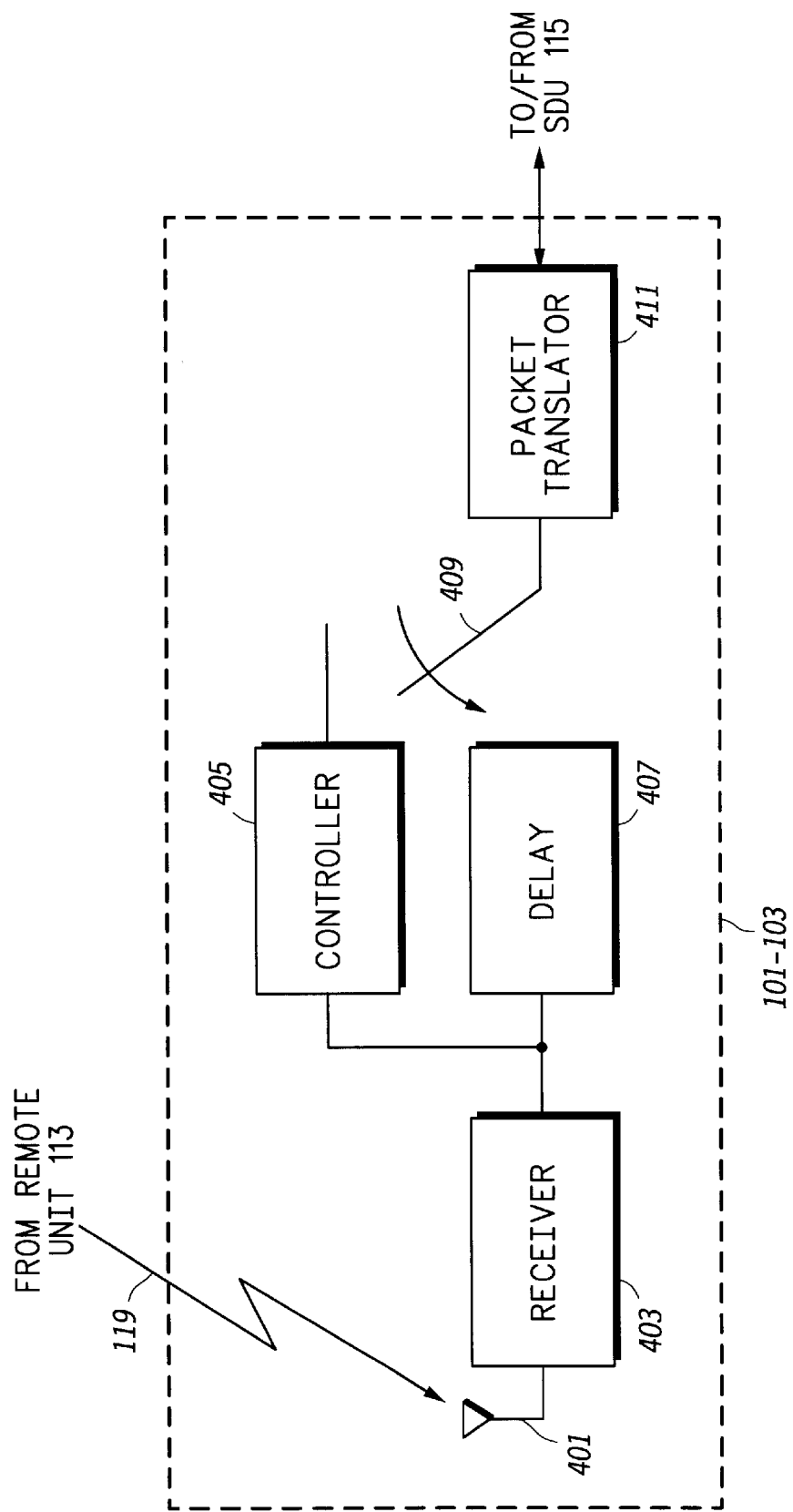
FIG. 4 depicts a block diagram of base stations in accordance with the preferred embodiment of the present invention.

FIG. 4 depicts a high-level block diagram of base stations 101–103 in accordance with the preferred embodiment of the present invention. As shown, base stations 101–103 comprise an antenna 401, a receiver 403, a switch controller

405, delay circuitry 407, a switch 409, and a packet translator 411. Switch controller 405 and delay circuitry 407 may be utilized as hardware or software within base stations 101–103. Operation of base stations 101–103 occurs as is illustrated in FIGS. 5 and 6.

Figure 5:
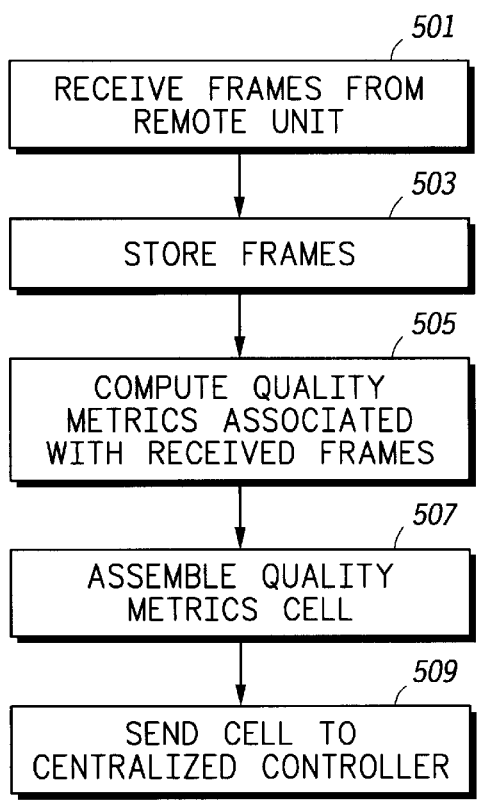
FIG. 5 depicts a flow chart for determining quality metric cells at a base station in accordance with the preferred embodiment of the present invention.

FIG. 5 depicts a flow chart for determining quality metric cells at a base station. The base station receives (501) frames from remote unit 113 at antenna 401. The base stations store (503) the demodulated frames at memory located at the base station. This allows the transfer of the frame to be delayed until the centralized controller deems a transfer of the frames desirable. The base station computes (505) the quality metrics as part of the receiver process. These metrics preferably relate to outputs of CRC checks and Viterbi decoder metrics indicative of received signal deviation from that transmitted. The base station then assembles (507) a metrics cell with the call quality metric(s) for active calls operating in accordance with the present invention at controller 405. The base station then sends (509) the quality metric cell to selector distribution unit 115.

Figure 6:
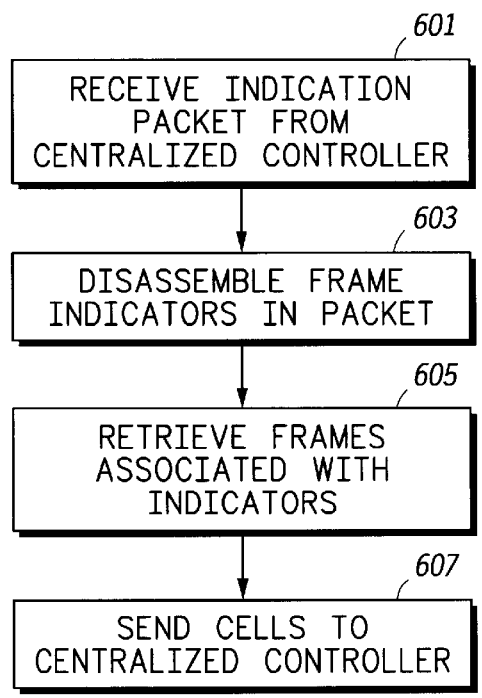
FIG. 6 depicts a flow chart for determining the stored data to send from a base station to the centralized controller in accordance with the preferred embodiment of the present invention.

FIG. 6 depicts the processing that occurs at a base station subsequent to the processing that occurs at the centralized controller as depicted in FIG. 3. The base station receives (601) an indication from the centralized controller. The indication will include which of the stored data frames the base station should send to the centralized controller. This processing preferably occurs at controller 405. The base stations then dissembles (603) the indicators at controller 405. This disassembling will determine which stored data frames should be sent to the CBSC. The base station then retrieves (605) the stored frames at the base station. In the preferred embodiment, the base station will retrieve the data frames associated with the preferred frames determined by the centralized controller, which was based upon the preferred quality metrics. The base station then sends (607) the cells with the preferred data frames to the centralized controller as packets or cells. Conceptually, this is accomplished by switching switch 409 to delay circuitry 407. The selected data frame is then sent to an appropriate unit in the centralized controller. As an example, if the data frame is an internet packet, it is preferably sent to the Packet Data Gateway.

It should be understood that the above processing described in FIGS. 4–6 is preferably performed at each base station 101–103. The processing is preferably only done during times when a remote unit is communicating with multiple base stations, such as during a period of soft handoff, but can alternately be done at all times. If the remote unit is communicating with a single base station, the centralized controller will instruct the base station to send a good data frame if the quality metric is above a predetermined quality threshold, or will not instruct the base station to send the data frame if the associated quality metrics fall below a predetermined threshold. In this manner, the present invention is an improvement over the prior art, since it will reduce the amount of backhauling in the communication system by eliminating the backhauling of bad data frames, particularly for latency-tolerant applications.

Each base station will send to the centralized controller any data frame in which the centralized controller determines that the quality metrics for this data frame are the best quality metrics for any base station that is in communication with the remote unit. If the base station does not receive an indication that a frame is good, it will discard the frame and not send it to the centralized controller. The base station may do this by overwriting the stored data frame in memory with a new data frame, or the base station may remove the data frame from memory upon the expiration of a predetermined event, such as a timer expiration or an interrupt.

FIG. 7 depicts a portion 700 of a quality metrics backhaul packet associated with one remote unit in accordance with the preferred embodiment of the present invention. Portion 700 of the quality metrics backhaul packet preferably includes three bytes. First byte 701 has eight bits and includes the first eight bits of information that identify the channel that portion 700 of the quality metrics backhaul packet relates to. Second byte 702 has eight bits and includes the last eight bits of information that identify the channel that portion 700 of quality metrics backhaul packet 700 relates to. First byte 701 and second byte 702 will uniquely identify, when viewed in combination, one particular remote user within the communication system. Third byte 703 includes information relating to the frame itself. The first three bits of third byte 703 depict the frame type. Some examples of frame type are speech type, video type, signaling type, and data type. The next three bits indicate the frame sequence number. This indicates which of a few frames per remote user this information refers to. The last two bits of third byte 703 are a quality indicator. In the preferred embodiment, a value of 00 indicates that the frame is bad, a value of 01 indicates that the quality of the frame is poor, a value of 10 indicates that the quality of the frame is fair, and a value of 11 indicates that the quality of the frame is good. Alternately, the Quality 2 bit could be reserved, while the Quality 1 bit could be used to indicate either that the quality of the frame is good or bad.

In the preferred embodiment of the present invention, each backhaul packet is an ATM cell that includes 48 bytes for payload information. A five byte header identifies the cell address and can be used to distinguish a quality metric cell from the ATM cell, such as one including frame data. Alternately, quality metrics could be muxed with other data into a single cell. Since channel quality portion 700 is comprised of 3 bytes of information, up to sixteen channels of information can be included in a single backhaul frame. If error protection for the quality metrics is desired, methods for error correction that are known in the art can be used. This error correction would accordingly reduce the number of channel quality portions that could be included in one ATM cell. This inclusion of multiple channel's quality data within a single frame also decreases the backhaul data within a communication system.

FIG. 8 depicts a portion 800 of an indication packet associated with one remote unit in accordance with the preferred embodiment of the present invention. Single user indication portion 800 preferably includes three bytes. First byte 801 has eight bits and includes the first eight bits of information that identify the channel that indication packet 800 relates to. Second byte 802 has eight bits and includes the last eight bits of information that identify the channel that indication packet 800 relates to. First byte 801 and second byte 802 will uniquely identify, when viewed in combination, one particular remote user within the communication system. Third byte 803 includes information relating to the frame itself. The first three bits of third byte 803 depict the frame type. Some examples of frame type are speech type, video type, and data type. The next three bits indicate the frame sequence number. This indicates which of a few frames per remote user this information refers to. The last two bits of third byte 803 are an indication to the base station of what the base station should do with the stored packet. In the preferred embodiment, the Indication 2 bit is reserved for future use, and the Indication 1 bit is used to instruct the base station. A value of 0 preferably indicates that the base station should not send the stored packet associated with this packet, while a value of 1 indicates that the base station should send the packet to the cellular infrastructure equipment. In the preferred embodiment, the centralized controller only sends an indication to a BTS when requesting the BTS to send data.

In the preferred embodiment of the present invention, each backhaul packet is an ATM cell that includes 48 bytes for payload information. Since each individual or channel quality metrics backhaul portion 700 and each individual channel indication portion 800 is comprised of 3 bytes of information, up to sixteen channels of information can be included in a single backhaul packet. This inclusion of multiple channel's quality data within a single packet also decreases the backhaul data within a communication system.

Thus, the present invention provides a method and apparatus for backhauling data in a communication system. Bandwidth on the backhaul links is significantly reduced by eliminating transmission of data packets from base stations to a centralized controller that are either bad or redundant. The present invention makes it more cost-effective to be in soft handoff mode a greater percentage of the time, thereby increasing the reliability of the communications. In addition, by including the quality metrics relating to multiple remote units within a single data packet, additional backhaul transmissions are reduced.

Each base station calculates a quality metric for a data frame sent from a remote unit. The base station then sends this quality metric to the centralized controller. In accordance with the present invention, multiple remote unit's quality metrics can be sent in one packet. In certain situations, such as in soft handoff situations, the remote unit will send the same data frame to multiple base stations. The centralized controller will collect the quality metrics from all base stations that have received the data frame from the remote unit. The centralized controller then determines which of the base stations should send the data frame to the centralized controller. The centralized controller can determine which frame has the best quality metric and request that base station to send the data frame to the centralized controller. If two or more base stations have the same quality metric for the same data, or if the quality metrics exceed a predetermined threshold, the centralized controller can instruct a preferred base station to send the data, or can look to see which of the base stations that have good data currently have the lightest load span.

In this manner, not only is the bandwidth of traffic on the backhaul connections minimized, but the traffic is more evenly distributed across the base stations.

In an alternate embodiment of the present invention, a predetermined base station within the communication system will backhaul every frame received from a remote unit. Additional base stations in communication with remote unit 113 will backhaul frames only when requested to do so by the centralized controller. In this manner, backhaul traffic is reduced by not having multiple base stations backhaul every frame received, but accuracy is increased by facilitating the transmission of redundant frames when necessary.

While this invention has been described in terms of certain examples thereof, it is not intended that it be limited to the above description, but rather only to the extent set forth in the claims that follow.

I claim:

1. A method for backhauling data in a communication system, the method comprising the steps of:
   in a centralized controller, receiving a plurality of quality metrics from a plurality of base stations, the plurality of quality metrics related to a data frame transmitted to the plurality of base stations from a remote unit, wherein the data frame is not received with an associated quality metric;
   determining whether at least one of the quality metrics exceeds a predetermined threshold; and
   in response to one of the quality metrics exceeding the predetermined threshold, signaling selected base stations to send the data frame to the centralized controller.

2. A method for backhauling data in accordance with claim 1, the method further comprising the step of determining a preferred data frame from among the plurality of data frames.

3. A method for backhauling data in accordance with claim 2, the method further comprising the step of signaling the base station associated with the preferred data frame to send the preferred data frame.

4. A method for backhauling data in accordance with claim 2, further comprising the step of sending a message to the base station associated with the preferred data frame to send the stored data frame to a centralized controller in communication with the base station associated with the preferred data frame.

5. A method for backhauling data in accordance with claim 1, further comprising the step of storing the data frame.

6. A method for backhauling data in accordance with claim 5, further comprising the step of discarding the stored data frame when it is determined that no quality metrics exceed the predetermined threshold.

7. A method for backhauling data in accordance with claim 5, further comprising the steps of:
   determining when a plurality of the quality metrics exceed the predetermined threshold;
   determining which of the plurality of base stations has the lightest load span; and
   setting an indication for the base station having the lightest load span.

8. A method for backhauling data in accordance with claim 7, further comprising the step of assembling an indication packet, the indication packet including the indication for the base station having the lightest load span.

9. A method for backhauling data in accordance with claim 8, further comprising the step of sending the indication packet to the base station having the lightest load span.

10. A method for backhauling data in accordance with claim 9, further comprising the step of discarding the stored data frame at the base stations that do not have the lightest load span.

11. A method for backhauling data in accordance with claim 1, further comprising the step of storing the data frame at each of the plurality of base stations.

12. A method for backhauling data in accordance with claim 11, further comprising the step of sending a message to each of the plurality of base stations to discard the stored data frame when it is determined that no quality metrics exceed the predetermined threshold.

13. A method for backhauling data in a communication system, the method comprising the steps of:
   transmitting a data frame from a remote unit to a plurality of base stations;
   calculating a quality metric at each of the plurality of base stations, the quality metric relating to the data frame transmitted from the remote unit;
   sending the plurality of quality metrics from each of the plurality of base stations to a centralized controller, wherein the data frame is not sent with an associated quality metric;

in response to the plurality of quality metrics, determining, at the centralized controller, a preferred data frame from among the data frames; and signaling the base station associated with the preferred data frame to send the preferred data frame to the centralized controller.

14. A method for backhauling data in a communication system in accordance with claim 13, the method further comprising the step of sending the preferred data frame from the base station associated with the preferred data frame to the centralized controller.

15. A method for backhauling data in accordance with claim 13, the method further comprising the step of storing the data frames at each of the plurality of base stations.

16. A method for backhauling data in accordance with claim 13, wherein the step of determining a preferred data frame comprises the step of comparing the quality metrics to each other.

17. A method for backhauling data in accordance with claim 13, wherein the step of determining a preferred data frame comprises the step of comparing the quality metrics to a predetermined threshold.

18. A method for backhauling data in accordance with claim 13, wherein the step of determining a preferred data frame comprises the step of determining which of the plurality of base stations has the lightest load span.

* * * * *